(12) United States Patent
Chen

(10) Patent No.: US 10,928,646 B2
(45) Date of Patent: Feb. 23, 2021

(54) GLASSES WITH REPLACEABLE LENSES

(71) Applicant: ARGUS VISION INTERNATIONAL LIMITED, Tainan (TW)

(72) Inventor: Lin Yun Chen, Tainan (TW)

(73) Assignee: ARGUS VISION INTERNATIONAL LIMITED, Tainan (TW)

(*) Notice: Subject to any disclaimer, the term of this patent is extended or adjusted under 35 U.S.C. 154(b) by 47 days.

(21) Appl. No.: 16/513,663

(22) Filed: Jul. 16, 2019

(65) Prior Publication Data
US 2020/0033627 A1    Jan. 30, 2020

(30) Foreign Application Priority Data
Jul. 26, 2018   (TW) ................................ 107125818

(51) Int. Cl.
*G02C 5/02*    (2006.01)
*G02C 5/00*    (2006.01)
*G02C 1/00*    (2006.01)

(52) U.S. Cl.
CPC ........... *G02C 1/10* (2013.01); *G02C 2200/08* (2013.01)

(58) Field of Classification Search
CPC ........ G02C 1/10; G02C 2200/08; G02C 5/02; G02C 2200/06; G02C 5/00
See application file for complete search history.

(56) References Cited

U.S. PATENT DOCUMENTS

| | | | | |
|---|---|---|---|---|
| 4,523,819 A | * | 6/1985 | Dianitsch | G02C 1/04 351/106 |
| 8,702,232 B2 | * | 4/2014 | Chen | G02C 5/16 351/133 |
| 8,931,894 B1 | * | 1/2015 | Chen | G02C 5/12 351/106 |
| 10,330,949 B2 | * | 6/2019 | Sheldon | G02C 5/122 |
| 2014/0063438 A1 | * | 3/2014 | Cater | G02C 5/12 351/62 |
| 2017/0322427 A1 | * | 11/2017 | Chen | G02C 5/12 |

OTHER PUBLICATIONS

The attached document was cited in a Taiwan Search Report for counterpart Taiwan Application No. 107125818 (an English translation is included).

* cited by examiner

*Primary Examiner* — Bumsuk Won
*Assistant Examiner* — Matthew Y Lee
(74) *Attorney, Agent, or Firm* — Bruce Stone LLP; Joseph A. Bruce

(57) ABSTRACT

Provided is a pair of glasses with replaceable lenses, including a frame, having a slot and a pivot part, wherein the pivot part includes at least one pivot hole; a lens, disposed in the slot of the frame; and a fastener, having a fixing groove and at least one elongate hole, wherein a pivot shaft is inserted within the at least elongate hole and the at least one pivot hole, so that the fastener is pivotally connected to the frame. When the frame and the top of the lens are disposed in the fixing groove of the fastener, the lens is buckled. Conversely, when the fastener is biased upward, the fastener is extended the length of by the elongate hole; the fixing groove of the fastener is separated from the frame and the lens, so that the lens can be taken out of the frame.

4 Claims, 5 Drawing Sheets

GLASSES WITH REPLACEABLE LENSES

BACKGROUND OF THE INVENTION

1. Field of the Invention

The present disclosure relates to a pair of glasses, and particularly relates to a pair of glasses having replaceable lenses.

2. The Prior Arts

In recent years, due to the improvement of material life, people are paying more and more attention to the decoration of decorative items, and the wearing of glasses has become one of the decorative items. In order to match the appropriate clothing, various styles of glasses have emerged, and gradually become popular. However, the conventional glasses are inconvenient in replacing lenses, so as to enable people to take longer to replace lenses, or enable people to replace the entire pair of glasses. Accordingly, it is not economically advantageous.

Further, the conventional glasses must be completed by tools or bolts during assembly, which causes problems in replacing lenses, and fails to achieve the purposes of replacing the lenses and failing to securely fix the lenses. It is easy to cause the lens to fall off, and will easily cause inconvenience to users.

Given the foregoing, it is one of the current important issues to provide a lens that can be quickly replaced by a user without using any tool. Moreover the lens may be effectively fixed in the frame.

SUMMARY OF THE INVENTION

In light of the foregoing problems, an objective of the present disclosure is to provide a pair of glasses having replaceable lenses. The lenses can be easily disposed in a frame or taken out of a frame without using any tool. Accordingly, the present disclosure can bring about a technical effect of easy lens replacement.

In order to achieve the above objective, the present disclosure provides a pair of glasses having replaceable lenses, including a frame, having a slot and a pivot part, wherein the pivot part includes at least one pivot hole; a lens, disposed in the slot of the frame; and a fastener, having a fixing groove and at least one elongate hole, wherein a pivot shaft is inserted with the at least one elongate hole and the at least one pivot hole, so that the fastener is pivotally connected to the frame, wherein when the frame and the top end of the lens are disposed in the fixing groove of the fastener, the lens is buckled, and when the fastener is biased upward, the fastener is extended by at least a length of the at least one elongate hole of the fastener, the fixing groove is separated from the frame and the lens, and the lens is taken out.

Preferably, an elongate hole of the at least one elongate hole has an extension space for the fastener to be displaced up and down.

Preferably, the lens is disposed in the frame or taken out of the frame without using any tool.

Preferably, the present disclosure further includes a pair of temples. The pair of temples is respectively pivoted to the frame.

DETAILED DESCRIPTION OF THE PREFERRED EMBODIMENT

The detailed description of the present invention is provided in combination with the accompanying drawings.

Figure 1:
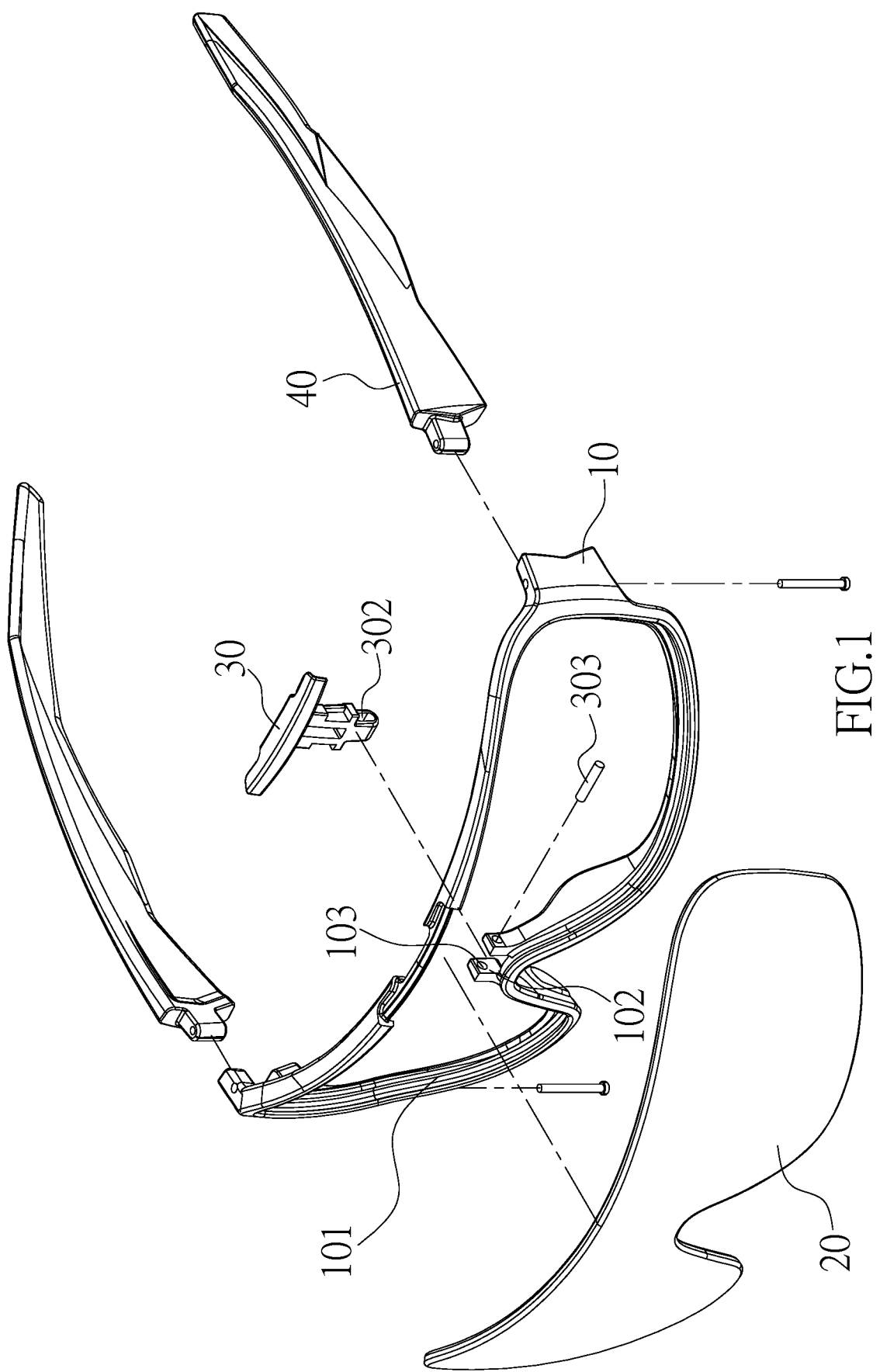
FIG. 1 is a three-dimensional exploded schematic diagram of a pair of glasses having replaceable lenses according to a preferred embodiment of the present disclosure.
Figure 2:
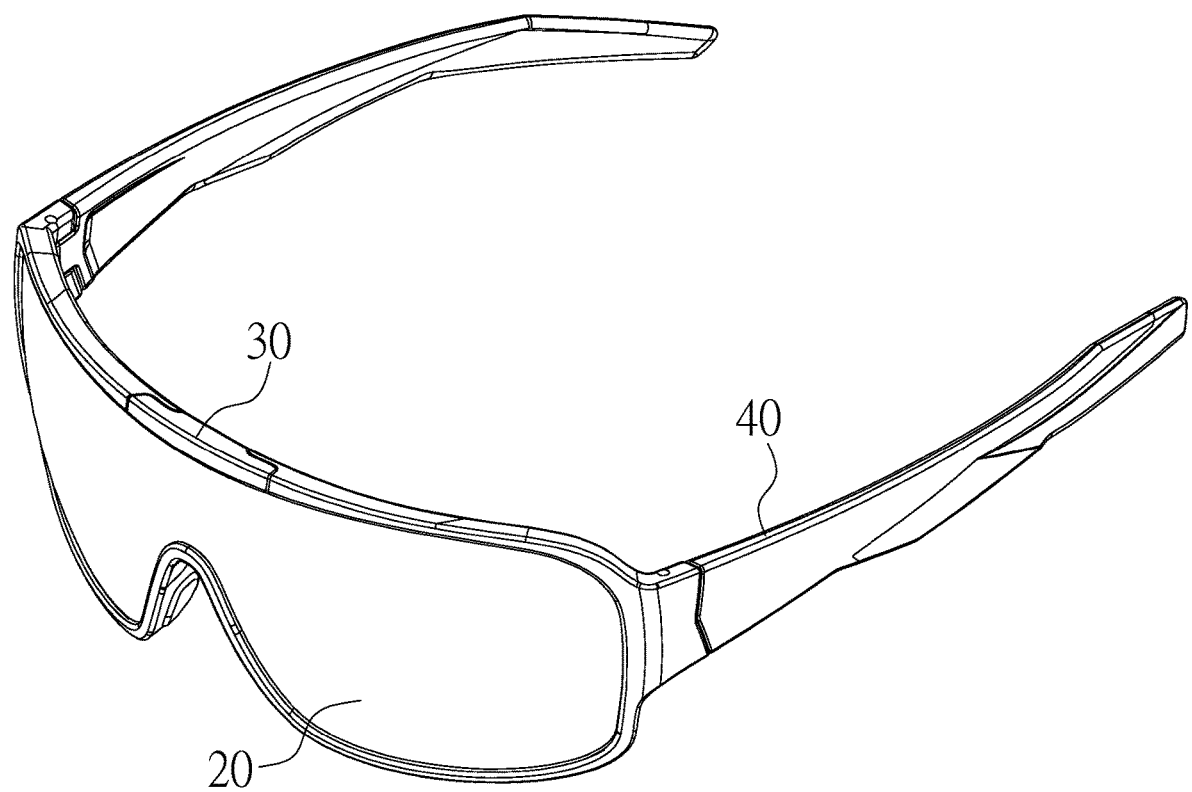
FIG. 2 is a three-dimensional schematic diagram of the pair of glasses having replaceable lenses according to the preferred embodiment of the present disclosure.
Figure 3:
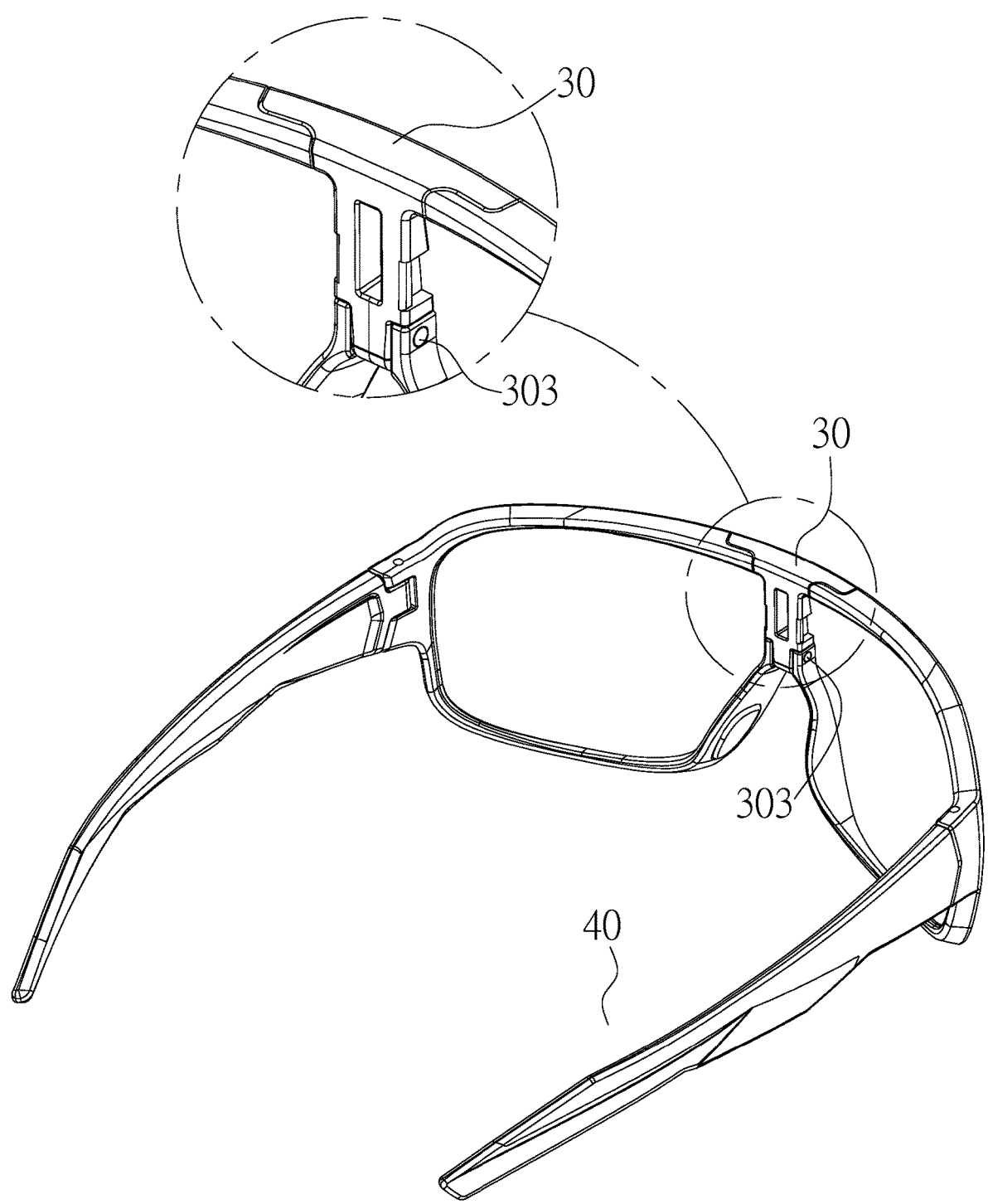
FIG. 3 is a partially enlarged schematic diagram showing a fastener of the pair of glasses having replaceable lenses shown in FIG. 2 according to the preferred embodiment of the present disclosure.
Figure 4:
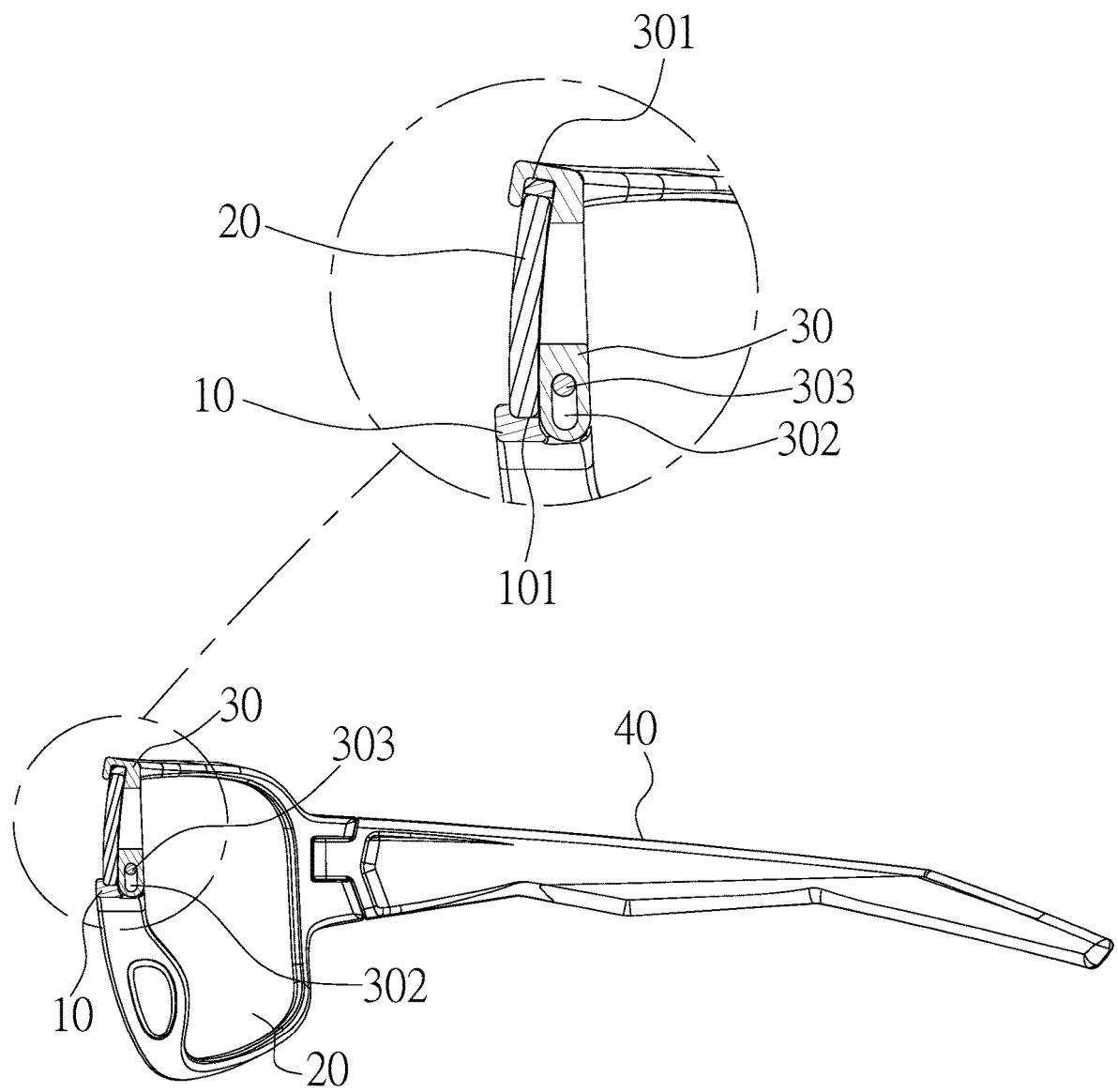
FIG. 4 is a partially enlarged cross-sectional diagram showing the fastener of the pair of glasses having replaceable lenses when the lenses are buckled according to the preferred embodiment of the present disclosure.
Figure 5:
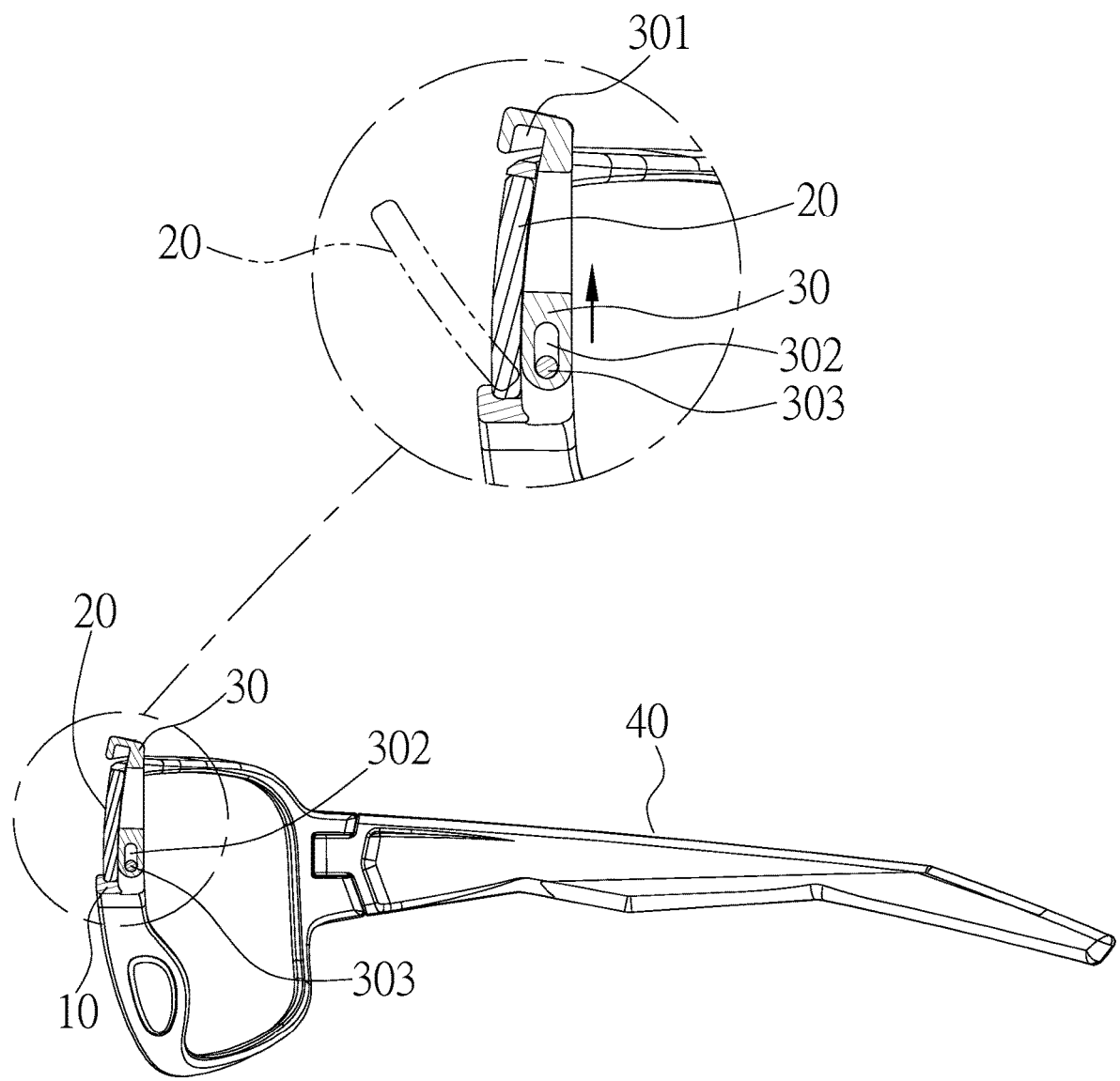
FIG. 5 is a partially enlarged cross-sectional diagram showing the fastener of the pair of glasses having replaceable lenses when the lenses are not buckled according to the present disclosure.

According to a preferred embodiment of the present disclosure, FIG. 1 shows a three-dimensional exploded schematic diagram of a pair of glasses having replaceable lenses. The present disclosure includes a frame 10, a lens 20 and a fastener 30.

The frame 10 may have a slot 101 and a pivot part 102. The pivot part 102 includes at least one pivot hole 103. The lens 20 is disposed in the slot 101 of the frame 10.

As shown in FIGS. 1-4, the fastener 30 may include a fixing groove 301 and at least one elongate hole 302. A pivot shaft 303 is inserted within the at least one elongate hole 302 and the at least one pivot hole 103, so that the fastener 30 is pivotally connected to the frame 10.

Please refer to FIGS. 1-5. When the frame 10 and the top end of the lens are disposed in the fixing groove 301 of the fastener 30, the lens is buckled; however, when the fastener 30 is biased upward, the fastener 30 is extended by at least a length of the at least one elongate hole 302 of the fastener 30, the fixing groove 301 is separated from the frame 10 and the lens 20, and the lens can be taken out of the frame 10.

According to the preferred embodiment of the present disclosure, the present disclosure further includes a pair of temples 40. The pair of temples 40 is respectively pivoted to the frame 10.

According to the preferred embodiment of the present disclosure, the elongate hole 302 has an extension space for the fastener 30 to be disposed up and down.

In summary, the present disclosure over the prior art has the following advantages. Since the pair of glasses of the present disclosure is composed of a frame, a lens and a fastener, the lens can be disposed in the frame or can be taken out of the frame without using any tool, thereby effectively shortening the time required for replacing the lens, and achieving the effect of simple lens replacement.

Although the present disclosure has been described with reference to the preferred exemplary embodiments thereof, it is apparent to those skilled in the art that a variety of modifications and changes may be made without departing from the scope of the present disclosure which is intended to be defined by the appended claims.

What is claimed is:

1. A pair of glasses having replaceable lenses, comprising:
a frame, having a slot and a pivot part, wherein the pivot part includes at least one pivot hole;
a lens, disposed in the slot of the frame; and a fastener, having a fixing groove and at least one elongate hole, wherein a pivot shaft is inserted within the at least one elongate hole and the at least one pivot hole, so that the fastener is pivotally connected to the frame, wherein when the frame and the top end of the lens are disposed in the fixing groove of the fastener, the lens is buckled, and when the fastener is biased upward, the fastener is extended by at least a length of the at least one elongate hole of the fastener, the fixing groove is separated from the frame and the lens, and the lens is taken out of the frame.

2. The pair of glasses having the replaceable lenses of claim 1, wherein an elongate hole of the at least one elongate hole has an extension space for the fastener to be displaced up and down.

3. The pair of glasses having the replaceable lenses of claim 1, wherein the lens is disposed in the frame or taken out of the frame without using any tool.

4. The pair of glasses having the replaceable lenses of claim 1, further comprising: a pair of temples, respectively pivoted to the frame.

\* \* \* \* \*